March 13, 1962 — G. MYSKA — 3,025,444
CONTROL SYSTEM FOR SEWING AND THE LIKE MACHINES
Filed Feb. 28, 1958 — 5 Sheets-Sheet 1

INVENTOR
Günter Myska
BY
ATTORNEY

March 13, 1962  G. MYSKA  3,025,444
CONTROL SYSTEM FOR SEWING AND THE LIKE MACHINES
Filed Feb. 28, 1958  5 Sheets-Sheet 2

INVENTOR
Günter Myska
BY
ATTORNEY

March 13, 1962  G. MYSKA  3,025,444
CONTROL SYSTEM FOR SEWING AND THE LIKE MACHINES
Filed Feb. 28, 1958  5 Sheets-Sheet 3

INVENTOR
Günter Myska
BY
ATTORNEY

March 13, 1962 G. MYSKA 3,025,444
CONTROL SYSTEM FOR SEWING AND THE LIKE MACHINES
Filed Feb. 28, 1958 5 Sheets-Sheet 5

INVENTOR
Günter Myska
BY
ATTORNEY 3,025,444
CONTROL SYSTEM FOR SEWING AND THE
LIKE MACHINES
Günter Myska, Mittelstrasse 8, Friedrichsdorf,
Westphalia, Germany
Filed Feb. 28, 1958, Ser. No. 718,169
Claims priority, application Germany Feb. 28, 1957
6 Claims. (Cl. 318—162)

The present invention operates to control systems for group stitch sewing and the like multiple operation machines, more particularly to a control system of the general type described in my co-pending patent application Serial No. 605,382, embodied in this application by reference, filed August 21, 1956, and entitled Position Control for Group Stitch Sewing and the Like Machines, now Patent No. 2,906,217, said system comprising essentially an electronic decade counting device adapted to count a predetermined limit number of electric counting pulses and to produce a control or output pulse upon reaching said limit number. The machine to be controlled, such as the feed motor advancing the work from one to the next of a plurality of operating positions relative to the stitch-forming or other operating tools of the machine, operates an electric pulse generator to produce a series of electric counting pulses, in such a manner that each pulse corresponds to a predetermined incremental movement or operation of said motor, while the total number of counting pulses corresponds to or is proportional to the number of revolutions of said machine or motor.

The counting pulses are applied to the input of said counting device which has been pre-set to a number complementary to the number of desired incremental movements or revolutions of said motor or equivalent movable member, such as by adjusting or setting the potentiometers normally associated with standard cathode ray decade counting tubes, to pre-set each tube to a predetermined digit corresponding to a desired composite counter setting number. The final pulse produced upon reaching of said limit number serves to initiate the stoppage of the feed motor, whereby to automatically control the operation of the machine (number of stitching operations) or of the work feed advance between one and the next sewing operation, by the proper pre-setting of said counter, in a manner more clearly described and explained in the above-mentioned patent.

There is further described and shown in said patent an arrangement to effect a variable work feed between successive sewing operations, comprising a multiple programme switch operated automatically, to vary the pre-setting of said counter between one and the next sewing operation, for instance, for the sewing of a plurality of buttons or button holes upon a work piece at predeterminedly spaced distances from one another.

Such a programming device consisting advantageously of a switching drum and being operated by a step-switch or the like actuating device, has the disadvantage, among others, that in order to change from one to another operating programme, or to enlarge or otherwise modify a given programme, or to include additional auxiliary controls and operations, a complete disassembly or disconnection may be required of the switch contacts and potentiometer resistances of the counting tubes. Furthermore, if the operating programme is to be extended, exchange of one programme drum against another drum may become necessary. Such change-overs can be carried out only by experienced or skilled personnel, aside from the fact that the number of controls and operations is greatly limited by mechanical and space limitations in the design of the switch and control devices.

Accordingly, an important object of the present invention is the provision of improved programming means for the automatic setting of the pulse counter in a control system of the general type afore-described, whereby the above-mentioned and related drawbacks and difficulties are minimized or substantially overcome.

A more specific object of the invention is the provision of an improved control system of this type, utilizing a storage or memory device, such as a perforated tape, magnetic or the like storage member, operated intermittently, in such a manner as to effect the pre-setting of the electronic counter in accordance with a desired operating programme comprising a series of predetermined sequential operations of the machine and/or work feed controls thereof.

Another object of the invention is the utilization of a storage or memory device, such as a perforated tape, magnetic storage tape or the like, to effect the setting of the counter of a control device of the afore-described type for a desired series of sequential operations and/or work feed controls, said tape or the like memory device being scanned or operated intermittently and prior to each operation to be controlled by said counter.

The use of a memory or storage device to control the setting of the electronic pulse counter in a system according to the invention has the further advantage that simultaneously any desired number of secondary controls may be effected simply and with a minimum of auxiliary parts and apparatus and by the provision of any additional number of perforations or equivalent storage data upon said device, the number of manual auxiliary controls being no longer limited by using a tape or record carrier of appropriate length wound upon a supply spool or drum and unwound therefrom unto a take-up spool during the scanning and pre-setting of the electronic counting device.

By the scanning of the perforated tape or other memory device by a separate drive means or scanning motor and independently of the operation of the sewing or the like machine or its work feed control, the length of the tape is considerably reduced compared with known machine tool and the like controls utilizing a synchronous tape driven continuously by the machine or the like movable member being controlled. In other words, a basic advantage of the invention is the fact that the periods of setting of the counter are restricted to a minimum, whereupon the operation of the machine or feed motor is effected independently of the operation of the programming device.

The arrangement according to the invention, enabling the direct application of the data stored upon the memory device to the step-switches or the like controls of the electronic counter, has the further advantage of enabling a simultaneous setting of the counter and control of the pulse generator as well as the drive means of the memory device and other auxiliary controls, in such a manner as to avoid switching delays and other defects during the control and release of both the main and auxiliary control devices.

In order to scan the storage or programming device, mechanical, electrical, magnetic, photoelectric or the like control and pick-up means may be used, while the intermittent operation of said device may be effected by suitable drive means controlled thereby and other co-operating elements of the system.

A further advantage of a storage or memory device to control the setting of the decade counter and the operation of the machine and auxiliary devices according to the invention, is the fact that the feed control may be combined with an automatic re-setting arrangement, to return the system to zero or a desired position within a given operating programme, for repetitive execution of the whole or part of the programme stored upon the memory device.

The invention, as to its further objects and novel aspects, will be better understood from the following detailed description, taken in reference to the accompanying drawings forming part of this specification and wherein.

Figure 3A:
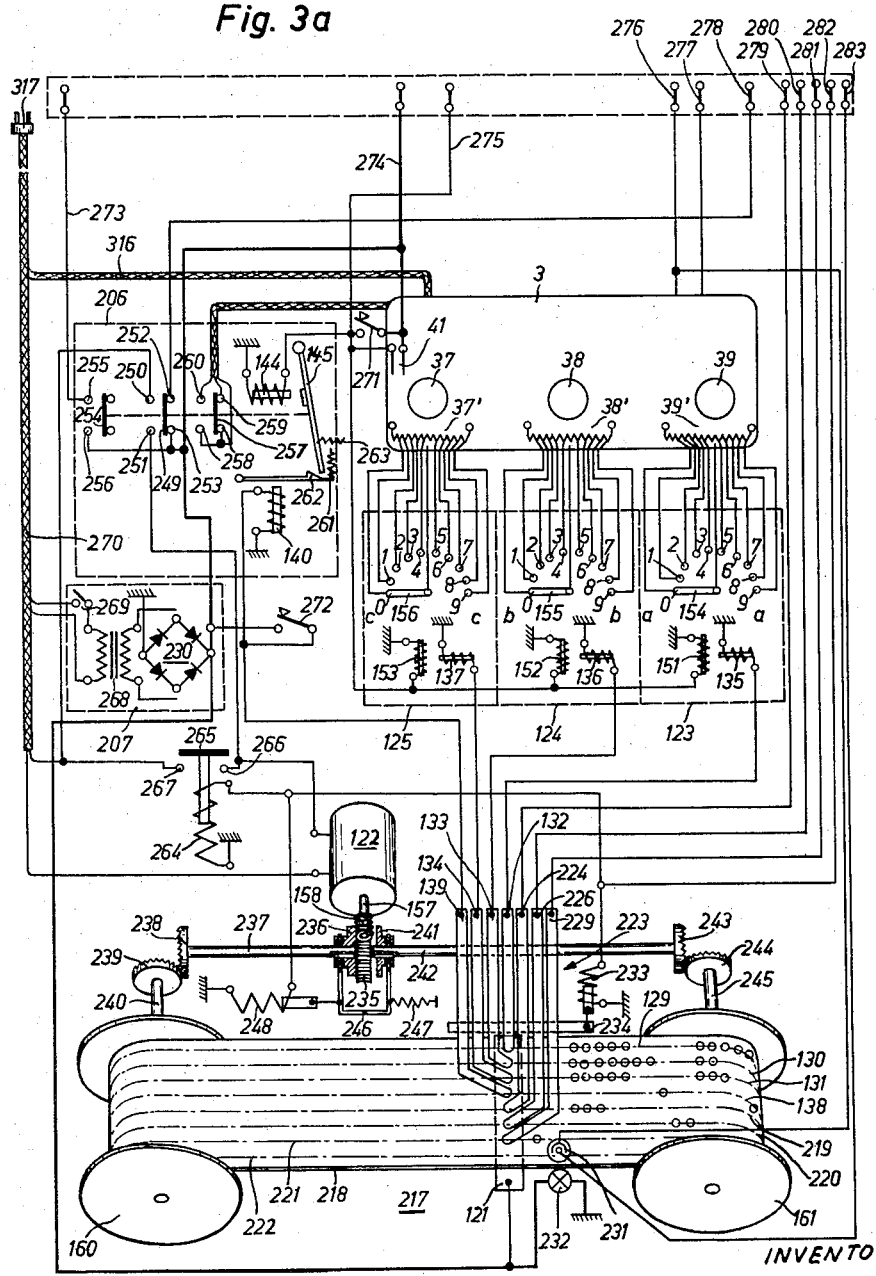
Figure 3B:
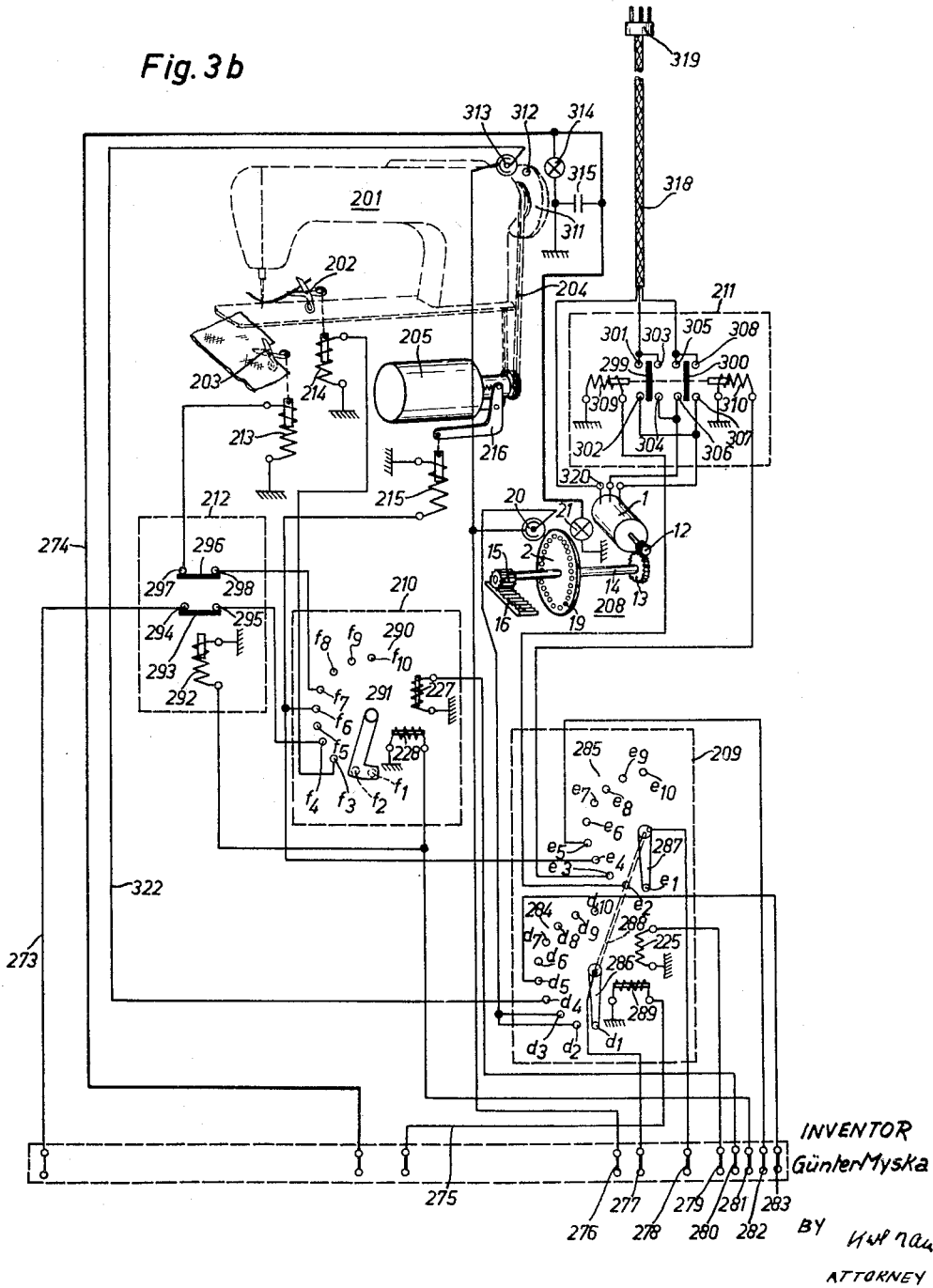
Figure 4:
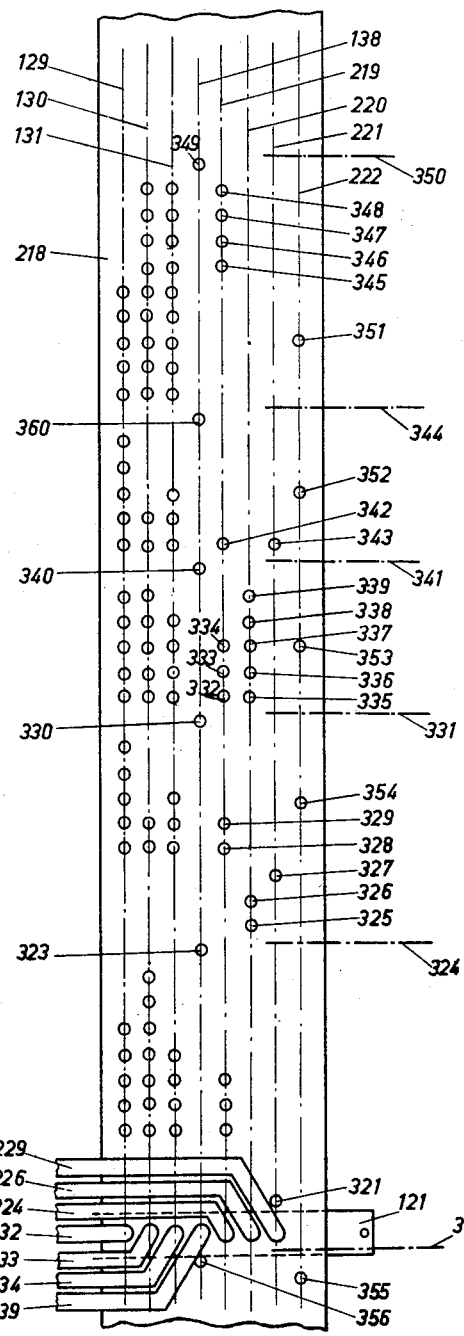

FIGS. 3a and 3b, the latter being a continuation of the former, are a schematic representation and wiring diagram of a modified control system according to the invention for sewing and the like machines, to enable a selective control of both the consecutive operations of a machine, as well as of the work feed between said operations, in addition to auxiliary operations and controls, according to a predetermined operating programme stored upon a perforated tape or equivalent memory device; and FIG. 4 is a more detailed showing of the perforated storage tape shown in FIGS. 3a and 3b.

Like reference characters are used to identify like parts and elements in the different views of the drawings.

Figure 1:
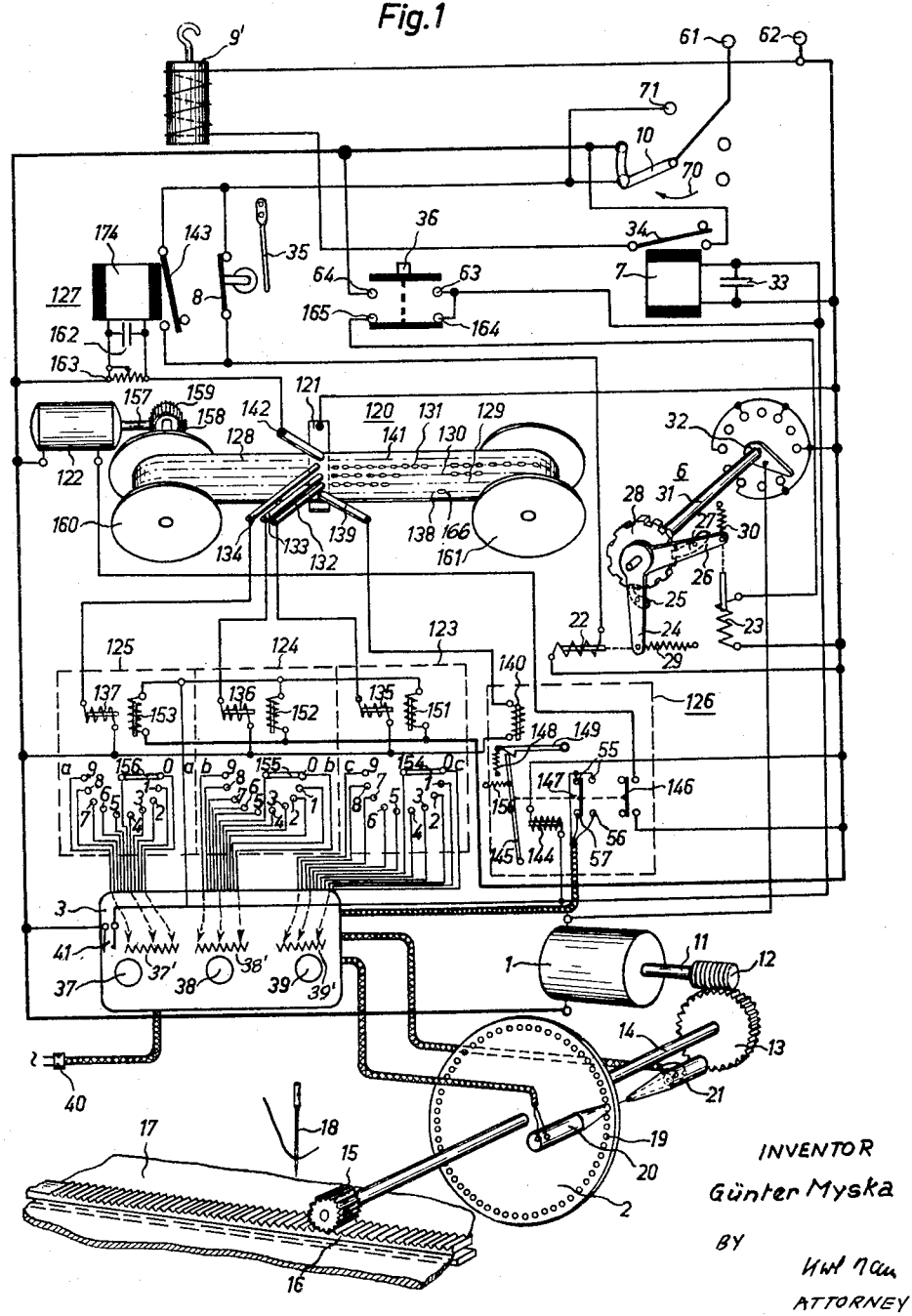
FIG. 1 is a schematic representation and wiring diagram of an automatic work feed control system for group-stitch sewing and the like multiple-operation machines embodying a programme storage tape, to control a predetermined number of operations of said machine at fixed predeterminedly spaced points of a work piece.
Figure 2:
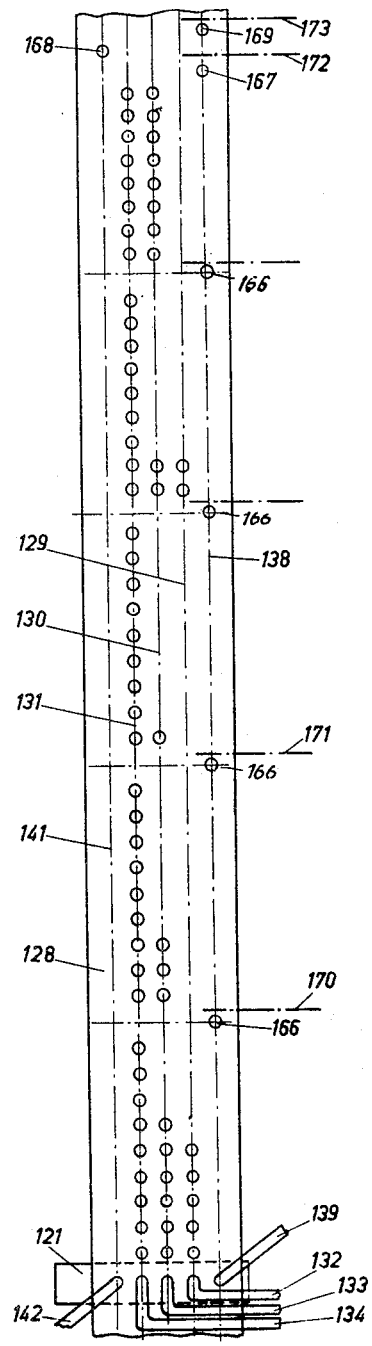
FIG. 2 is a more detailed view of the perforated control tape forming part of FIG. 1.

Referring more particularly to FIGS. 1 and 2 of the drawings, the control system shown comprises essentially the main elements as described in the above-mentioned copending application, viz. a work feed motor 1, an electronic decade counter 3 connected to the perforated disc light chopper or counting pulse generator 2 comprising a light source 20 and photoelectric cell 21 and being driven by said motor, a programming device 120, forming a permanent data storage device having a contact plate 121 and a drive motor 122, step selector switches 123, 124, 125 forming a temporary storage device, for setting the counter 3, a switching arrangement 126, a step relay 6 controlling the feed motor 1, a starting relay 7 for the sewing machine, a work clamp lever 35 of the sewing machine operating a contact 8, a delayed-action relay 127 cooperating with the latter, a starting magnet or solenoid 9', to initiate the operation of the sewing machine, a manual starting switch or button 36 and a main power or control switch 10. The decade counter 3 is shown to comprise three counting tubes 37, 38, 39 provided with adjusting potentiometers 37', 38', 39' for pre-setting the counter to a predetermined number, in the manner described in greater detail in the above-mentioned patent, the pre-setting of the tubes in accordance with the present improvement being effected by the step-switches 125, 124, 123, respectively, which act as temporary storage devices in cooperation with the permanent storage device, such as the perforated tape 128 to be described presently.

In order to pre-set the counter 3, there is utilized according to the present invention a perforated tape arrangement comprising the perforated tape 128 provided with three rows of perforations 129, 130 and 131 controlling the pre-selection of a desired number of the counter 3. The tape 128 is scanned by means of pickup contact fingers or tongues 132, 133 and 134 cooperating with the contact plate 121 and being connected to the control magnets 135, 136 and 137 for the step-by-step operation of the selector switches 123, 124 and 125, respectively.

A further row of perforations 138 upon the tape 128 and cooperating pickup contact 139 serve for the control of a release magnet 140 of the switching arrangement 126 which, in turn, serves to effect disconnection of the drive motor 122 of the tape, as well as the setting of the counting tubes 37, 38 and 39 to a desired number punched or stored upon the tape 128.

A further row of perforations 141 upon the tape 128 and cooperating pickup contact 142 serves to bridge the contact 8 at predetermined and pre-selected positions of the tape 128 by a contact 143 controlled by a delayed-action relay 127.

The switching arrangement 126 includes a switching magnet 144 connected with the contact 41 of the counter 3 being closed upon reaching of the limit number, in the manner described in said copending application, the armature 145 of the magnet 144 being, in turn, connected to a first switch 146 for the drive motor 122 of the programmer 120 and a further three-pole switch 147. The armature 145 cooperates with a pawl 149 subject to the tension of a spring 148 and controlled by the release magnet 140, to actuate the armature 145 and the switches 146 and 147 against the action of a further return spring 150.

Further connected to the contact 41 of the counter 3 are return control magnets 151, 152 and 153 for the contact arms 154, 155 and 156 of the selector step switches 123, 124 and 125. The shaft 157 of the drive motor 122 of the programmer 120 carries a worm 158 which meshes with a worm gear 159 driving a takeup drum 160 for the tape 128, the latter being unwound from a supply drum or spool 161.

A capacitor 162 is connected in parallel to the winding 174 of the delayed-action relay 127, the discharge time of said capacitor being adjustable by means of a variable shunt resistor 163.

For the purpose of explaining the operation and function of the control device, it is assumed that six button holes are to be sewn automatically upon the work piece 17 by the needle 18 at distances of 35, 70, 90, 78 and 120 mm. from one another by the control of the feed motor advancing the work 17 through the rack and pinion drive 16, 15. For this purpose, the tape 120 shown in FIG. 2 in unwound condition and on an enlarged scale is pre-punched, in a manner described in the following.

Depending upon the assumed spacing distances of 35, 70, 90, 78 and 120 mm. between the button holes to be sewn, the following complementary numbers 965, 930, 910, 922 and 880 must be pre-selected sequentially and set in the counter 3. For this purpose, five holes are punched in the row 129 of the tape 128, which serve to control the decade tube 39. Furthermore, the row 130 serving to control the decade tube 38 is provided with six holes and, finally, the row 131 controlling the tube 37 is provided with nine holes, as shown in the drawing, to result in the desired complementary number 965. Further punched at a distance from the ninth hole of the row 131 is a hole 166 of the row 138 which serves to control the disconnection of the drive motor 122 of the tape 128 after termination of the pre-selection or setting of a desired number of the counter. In the same manner, the numbers 930, 910, 922 and 880 are sequentially punched in the tape 128, each number being followed by a perforation 166 upon the row 131, as shown in detail in FIG. 2.

Further arranged at a distance from the last hole 167 of the row 138 is a hole 168 upon a row 141 which serves for the control of the delayed-action relay 127. A further hole 169 is provided upon the row 138 at a distance from the hole 168. The purpose and function of these secondary perforations and controls effected thereby will become further apparent as the following description proceeds.

The tape 128 being unwound from the supply drum 161 is passed between the contact plate 121 and the pickup contacts 132, 133, 134, 139 and 142, the end of the tape being attached to the take-up drum 160. Normally the pickup contacts are separated and electrically disconnected from the plate 121 by the tape 128 and are closed to establish a control circuit if one of the holes coincides with one of the contacts, in a manner readily understood.

In order to place the device in operative condition, the main switch 10 is operated in the direction of arrow 70 from its Off to its On position, as shown in the drawing. The button hole sewing machine is still at rest, resulting in a closing of the contact 8. Operating voltage is applied by way of terminals 61, 62, switch 10, and contact 8 to the control magnet 22 of the step relay 6, whereby to move the contact arm 32 from one of its On positions to Off position, as shown in the drawing and described in further detail in my above-mentioned copending application. At the same time, the electronic counter 3 is connected to the power supply. Upon insertion of the work piece 17 in a suitable work clamp or support, the manual starting switch or button 36 is depressed briefly, whereby to energize the starting relay 7 by way of contacts 63 and 64 and, in turn, to excite the starting magnet or solenoid 9′ of the sewing machine by closing of relay contact 34. The solenoid 9′ operates a starting lever or the like of the sewing machine, as shown at 216 in FIG. 3b, thus initiating the sewing operation of a button hole or equivalent operation of the machine. At the same time, the work clamp lever 35 opens the contact 8, whereby to result in de-energization of the control magnet 22 of the step relay 6. As a result, the pawl 25 slides back over the ratchet 28, without operating the contact arm 32 which remains in its Off position.

During closing of the starting switch 36, contacts 164 and 165 are opened to interrupt the circuit of the further control magnet 23 of the step relay 6. Furthermore, closing of switch 36 results in the excitation of magnet 144 of the switching arrangement 126, whereby to attract armature 145 against the action of a spring 150. The pawl 149 subject to the action of spring 148 locks the armature 145 in its attracted position, whereby the drive motor 122 is energized by way of switch 146 closed by the armature 145. At the same time, contact springs 55 and 56 are closed, causing each of the counting tubes to indicate the digit "9," for control and monitoring purposes.

The temporarily closed contacts 63 and 64 of the starting switch 36 further cause the energization of the return magnets 151, 152 and 153 of the switch arms 154, 155 and 156 of the step selector switches 123, 124 and 125, whereby to re-set the arms 154, 155 and 156 to the starting positions $c_0$, $b_0$ and $a_0$, as shown in the drawing.

The drive motor 122 rotates the take-up drum 160, whereby the tape 128 is passed between the contact plate 121 and the pickup contacts 132, 133, 134, 139 and 142. During this time the machine sews the first button hole. During the passage of the tape between the contacts, electrical control pulses are applied to the control magnets 135, 136 and 137 of the step selector switches 123, 124 and 125 in accordance with the perforations punched in the tape, whereby to advance the contact arms 154, 155 and 156 step-by-step to the respective pre-selected counting numbers or digits. More particularly, in the example mentioned, the contact arm 154 will be connected with the lead $c_5$, the contact arm 155 will be connected with the lead $b_6$ and the contact arm 156 will be connected with the lead $a_9$ of the counter 3, corresponding to the complementary number "965" punched upon the tape 128 and determining the first work feed advance.

During the continued movement of the tape 128, a control pulse is applied through the hole 166 of the row 138 to the release magnet 140 by way of the contact plate 121 and contact 139, whereby to attract the pawl 149 against the action of the spring 148 and to release the armature 145. This causes a disconnection of the switch 146 inserted in the circuit of the drive motor 122 of the programmer 120, whereby to arrest the tape 128 at a stoppage point indicated at 170 in FIG. 2.

During the opening of the switch 146, the spring contacts 55 and 57 are connected with each other, whereby to set the counting tubes 37, 38 and 39 to the pre-selected number, that is, "965" controlling the first feed movement of the work piece 17.

After sewing the first button hole, the machine is automatically stopped by the action of stop motion device associated with standard group-stitch sewing machines, resulting in re-closing of the work clamp contact 8. As a result, the control magnet 22 is re-energized, whereby to advance the contact arm of the step relay 6 to the next On position. This, in turn, starts the feed motor 1 and advance of the work piece 17 to the next operating position. At the same time, each perforation 19 of the light chopper 2 produces a counting pulse applied to the input of the counter 3. Each pulse corresponds to a predetermined incremental movement of the work piece 17 and, since the tubes 37, 38 and 39 have been pre-set to the number "965," the contact 41 of the counter 3 will be closed after 35 pulses or transition from the number "999" to the number "000" of the counter.

This results in energization of the second control magnet 23 of the switch relay 6 through the closed contacts 164, 165 of switch 36, whereby to move the contact arm 33 to its next Off position and to arrest the feed motor 1 which advantageously is provided with an instantaneous or quick-action braking device. At the same time, the starting relay 7 is energized resulting in charging of the capacitor 33, which subsequently releases its charge upon the relay 7. As a result, relay contact 34 is closed after a definite time delay, whereby to energize the starting solenoid 9 and to initiate the sewing of the second button hole by the machine.

At the same time, closing of the contact 41 results in a temporary excitation of the return magnets 151, 152 and 153, to cause the associated contact arms to be returned to their zero positions or connection with leads $c_0$, $b_0$ and $a_0$, respectively, from the adjusting potentiometers of the counter tubes 37, 38 and 39. Furthermore, the magnet 144 is re-energized to start the programmer 120 and to initiate the pre-selection and setting of the next counting number, that is, number "930" according to the example mentioned. Upon reaching the stoppage point 171, the tape 128 is again arrested by the control pulse caused by the perforation 166.

The afore-described operations are repeated automatically up to the completion of the fifth button hole. After the subsequent setting of the switches 123, 124 and 125, the tape 128 is at the position 172 and the feed motor 1 is started to advance the work piece to its sixth operating point. Upon reaching the latter, closing of contact 41 results in the following further operations. The feed motor 1 is arrested, the sewing machine is started through relay 7 after a certain delay period, the feed motor 122 for the tape 128 is started instantly and the selector switches 123, 124 and 125 are returned to their zero positions $c_0$, $b_0$ and $a_0$.

During continued operation of the drive motor 122, the hole 168 of the row 141 initiates the closing of a circuit through contact 142 and contact plate 128, whereby to apply a voltage pulse to the delayed-action relay and to close contact 141 connected parallel with the contact 8. Depending upon the size of the capacitor 162, it is possible to maintain contact 143 in closed position during a period until after the machine has completed the sewing of the last button hole. In this case, the magnet 22 of the step relay is continuously energized, in such a manner that after completion of the last button hole the feed motor 1 is no longer set into operation.

In the meantime, the tape 128 has been arrested at the position or stoppage point 173, after disconnection by the switching arrangement 126 controlled by the perforation 169.

After the sewing programme stored upon the tape 128 has been completed, the delayed-action relay is released in the manner described and the system returned to a condition for the initiation of a new sewing or other operating programme.

The discharge time of the capacitor 162 shunting the coil 174 of relay 127 may be varied by control of the variable resistor 163, to correspondingly vary the delayed release of the contact 143.

The device may be disconnected in the manner described by rotation of the switch 10 in the direction of arrow 70, whereby to operate the relay 6 to On position by temporarily closing a contact 71. The feed motor in this case remains at rest, since the power supply has been disconnected.

Further details relative to FIG. 1, such as the construction and function of the decade counter 3, the step switch 6 etc., will be apparent from the above-mentioned copending application which is hereby incorporated into the present description by reference.

Referring to FIGS. 3a and 3b of the drawings, there is shown a more versatile and general control system for sewing and the like machines according to the invention which will allow a pre-selection and control of both the operation of the machine (number of stitches, etc.) as well as of the work feed in either forward or backward direction, in conjunction with any number of additional or auxiliary controls or operations, including return of the system to starting position after completion of a full sewing or other operating programme stored by a punched tape or equivalent memory device.

The sewing machine 201, FIG. 3b, in the example shown, includes a thread cutter 202 and an edge trimmer 203 and is driven by a coupling motor 205 through a belt 204.

The complete control device comprises the following parts or elements: an electronic counter 3, FIG. 3a, step selector setting switches 123, 124 and 125, a programmer 217, a switching device 206, a rectifier power supply 207, a work feed device 208, FIG. 3b, a step switch 209, a further step switch 210, a polarity reversing switch 211 for the work feed motor, an electromagnetic circuit breaker 212, operating magnets 213, 214 and 215 for the edge trimmer 203, the thread cutter 202, and a starting lever 216 for the coupling motor 205.

The electronic counter 3 again is shown to comprise three decade counting tubes 37, 38 and 39 and potentiometers 37', 38' and 39' connected to the contacts of the selector switches 123, 124 and 125, in a manner similar as shown in FIG. 1. The programmer 217 comprises the tape 218 punched with a plurality of rows of perforations in the manner more clearly shown in FIG. 4. More specifically, a row 129 is provided for the setting of the first decade tube 39, a row 130 serves to control the setting of the second decade tube 38 and a row 131 serves to set the third decade tube 37. Similarly, a row 138 serves to control the switch 206, a row 219 serves to control the switch 209, a row 220 controls the switch 210 and of the circuit breaker 212, while a row 222 serves to control the return of the tape to zero position upon completion of an operating programme.

The scanning or pickup device 223 for the tape 218 comprises the contacts or fingers 132, 133 and 134 connected to the control magnets 135, 136 and 137 of the selector switches 123, 124 and 125, respectively. The pickup contact 139 is connected to the release magnet 140 of the switch 206. A further pickup contact 224 is connected to the control magnet 225 of the step switch 209, while pickup contact 226 serves to control the operating magnet 227 of the step switch 210 whose return magnet 228 is connected to contact finger 229. The contact fingers cooperate with the contact plate 121 which is connected to one terminal of the power supply 207 or rectifier 230. The row 222 cooperates with a photoelectric cell 231 excited by a light source 232. A lifting magnet 233 serves to lift the contacts 132, 133, 134, 139, 224, 226 and 229 during the return of the tape 218 by means of a lift rod 234, whereby the contacts are disengaged from the plate 221 during the return movement of the tape to zero or starting position.

The tape 218 is unwound from the supply drum 161 and wound upon the take-up drum 160 by means of a drive motor 122 having a shaft 157 upon which is secured a worm 158 driving a worm gear 235. By means of a coupling disc 236 it is possible selectively to couple with the worm gear 235 either the take-up drum 160 through a first shaft 237, bevel gears 238, 239 and drive shaft 240, or to couple the supply drum through a further coupling disc 241 through a shaft 242, bevel gears 243, 244 and a drive shaft 245. To this end, the coupling discs 236 and 241 are slidingly mounted upon the shafts 237 and 242 and connected with one another through a stirrup 246 engaging sleeves of both discs 236 and 241. The coupling disc 236 is under the action of a tension spring 247, to normally engage the worm gear 235. A coupling magnet 248 connected with the stirrup 246 serves to couple the disc 241 with the worm gear 235 and at the same time to disconnect the disc 236. The switching device 206 includes the switch 144 upon whose armature are mounted a reversing switch 249 having contacts 250, 251, 252 and 253, a further switch 254 having contacts 255 and 256 and a reversing switch 257 having contacts 258, 259 and 260. Armature 145 cooperates with a pawl 262 subject to the action of a spring 261 and being controlled by the release magnet 140, to control the armature 145 and switches 249, 257 and 254 by the action of the spring 263. A relay 265 controlled by magnet 264 has its contacts 266 and 267 connected in parallel to the contacts 250 and 251 of the reversing switch 249. The rectifier 230 is supplied by a transformer 268 which is connected to a power supply cable 270 by way of a switch 269.

A key 271 connected in parallel to the contact 41 of the counter 3 serves to control the switch 206. A further key 272 connected in parallel to the pickup contact 139 and contact plate 121 is provided, to enable a manual control of the release magnet 140 of the switching device 206.

The step switch 209 comprises a first set of contacts 284 shown at $d_1 \ldots d_{10}$ and a second set of contacts 285 shown at $e_1 \ldots e_{10}$. The control magnet 225 step-by-step operates the contact arms 286 and 287 mounted upon a common shaft 288 and being insulated from one another. The return magnet 289 serves to return the contact arms 286 and 287 to the starting position, as shown in the drawing.

The step switch 210 has a control magnet 227, a return magnet 228 and a set of contacts 290 shown at $f_1 \ldots f_{10}$ cooperating with a movable contact arm 291. The latter is constructed so as to connect two of the contacts $f_1 \ldots f_{10}$ in any of its operating positions. The circuit breaker 212 has an operating magnet 292 controlling a first switch 293 having contacts 294 and 295 and further switch having contacts 297 and 298.

The work feed device comprises, in a known manner, the feed motor 1 which serves to operate the work support or clamp through a worm gear drive 12, 13 and a rack and pinion drive 16, 15, in the same manner as shown in FIG. 1. Shaft 14 of the pinion 15 carries the light chopper disc 2 having perforations and cooperating with a photoelectric cell 20 and light source 21, to generate electric counting pulses applied to the counter 3 during the operation of the feed motor 1 or the sewing machine 205, respectively.

The feed motor 1 is connected to the polarity reversing switch 211 comprising two reversing switches 299 and 300 having contacts 301, 302, 303, 304 and 305, 306, 307, 308, respectively. The switches 299 and 300 are mounted upon a common shaft and positioned normally between the contacts, whereby to be engaged with either the contacts 301, 302 or 305, 306, on the one hand, or with the contacts 303, 304 or 307, 308, on the other hand.

Mounted upon the arm shaft of the sewing machine is a further perforated disc or light chopper 311 provided with a perforation 312 near its circumstance and cooperating with a photoelectric cell 313 and light source 314, in a manner similar to the light chopper or pulse generator 2 of the work feed motor 1, to produce electric counting pulses proportional to the speed or number of revolutions of the sewing machine. Connected in parallel to the light sources 21, 232, and 314 is a smoothing capacitor 315 to stabilize the operating voltage.

The operation of the control system afore-described will now be described on the basis of a sewing programme comprising five operating steps as outlined, by way of example, in the following:

(1) Sewing of a seam of 525 stitches and cutting of the thread;

(2) Advance of the work piece by a distance of 675 mm.;

(3) Sewing of a seam of 545 stitches and simultaneous edge trimming of the work;

(4) Return of the work piece by a distance of 675 mm.;

(5) Return of the storage tape 218 to initial or starting position.

To begin with, the tape 218 is pre-punched in the manner shown in FIG. 4 and device connected to the power source through cable 270, 316 and connecting plug 317 and through cable 318 and plug 319. Upon closing of the switch 269 of the power supply 267, operating voltage is applied to the contact plate 121, light source 232, key 272, contact 256 and contacts 253, 252, to contact arm 287 by way of lead 273, to contact 41, key 271 and light sources 314 and 21. Furthermore, operating potential is applied to the contacts 301, 303, 305 and 308 of the polarity reversing switch 211 as well as to terminal 320 of the feed motor 1. At the same time, the coupling motor 205 of the sewing machine 201 is energized and the tape 218 has a position as shown in FIGS. 3b and 4, that is, the pickup contacts are insulated from the contact plate 121.

Upon closing the key 271, magnet 144 is energized and attracts its armature 145 which is retained in attracted position by the pawl 262 against the action of spring 261. This, in turn, causes operation of the switches 249, 257 and switch 254. As a result, switch 257 connects contacts 258 and 260, whereby the counting tubes are set to the counting number "999." Furthermore, operating potential will be applied to the contact $f_4$ of the step switch 210 by way of contacts 256 and 255, lead 273 and the closed contacts 294 and 295.

Operating potential is also applied to the drive motor 222 of the tape 218 by way of contacts 250 and 251, thus driving the take-up drum 160 through worm 158, worm gear 235, coupling discs 236, shaft 237, bevel gears 238 and 239 and shaft 240.

Furthermore, upon closing of key 271, the return magnets 151, 152 and 153 have been energized, whereby to effect return of the contact arms 154, 155 and 156 of the selector switches 123, 124 and 125 to the zero positions $a_0$, $b_0$ and $c_0$, respectively. At the same time, the return magnet 289 is excited temporarily through lead 275, to cause contact arms 286 and 287 of the step switch 209 to return to the starting positions $d_1$ and $e_1$, respectively.

The perforation 321 upon the row 221, FIG. 4, causes contact finger 229 to engage briefly the contact plate 221, whereby to produce a control pulse applied to the return magnet of the step switch 210 through lead 281 and, in turn, to cause the contact arm 291 to return to the free contacts $f_2$ and $f_1$. This current pulse also causes energization of the switch magnet 292, whereby to interrupt the contacts 297, 298 and 294, 295 of the circuit breaker 212 during the return of the contact arm 291.

During movement of the tape 218, five current pulses are applied to the control magnet 135 as a result of the five holes of the row 129, whereby the contact arm 154 will be advanced to the contact $d_5$. In a similar manner, the seven contacts of the row 130 cause the contact arm 155 to be adjusted to the contact $b_7$ by the magnet 136, while the four holes of the row 131 result in the adjustment of the contact arm 156 to the contact $c_4$ by the magnet 137, thereby completing the setting of the counter to the pre-selected number "475."

The three holes of the row 219 cause the production of three pulses applied to the control magnet 225 of the step-switch 209 by way of lead 279, whereby to adjust the contact arms 286 and 287 to the contact positions $d_4$ and $e_4$, respectively. As a result, the photoelectric cell 313 is connected to the counter 3 through lead 276, lead 322, contact $d_4$, contact arm 286 and lead 277. The magnet 215 for the starting lever 216 of the coupling motor 205 is connected to open contact 252 through contacts $e_4$, contact arm 287 and lead 278.

By the hole 323 of the row 138 a pulse is applied to the release magnet 140 of switch 206 which attracts the pawl 262, whereby to enable the armature 145 with its reversing switches 257, 284 and the switch 254 to be returned to the position shown in FIG. 3a. The contacts 255, 256 of the switch 206 as well as the contacts 250, 251 are opened, whereby to interrupt the circuit of the tape driving motor 122 and arresting the tape at the stoppage point 324, FIG. 4. Furthermore, contacts 258, 259 are closed, resulting in the decade tubes 39, 38, 37 to be set to the pre-selected number "475."

The operating magnet 215 of the coupling motor 205 is energized through contacts 252, 253 of switch 206, lead 278, contact arm 287 and contact $e_4$, whereby to start the sewing machine 201 and to produce a counting pulse during each revolution by the action of the disc chopper 311, photoelectric cell 313 and light source 314. The counting pulses are applied to the counter 3 through leads 276 and 277, in such a manner that after completion of 425 stitches or transition from counting number "999" to "000" a control pulse is released by the contact 41. By the latter, the contact arms 154, 155 and 156 of the selector switches 123, 124 and 125 are returned to the starting positions $a_0$, $b_0$ and $c_0$ and the contact arms 286 and 287 of the step switch 209 are returned to their starting positions $d_1$ and $e_1$, respectively. The armature 145 of the switch 206 is attracted by the magnet 144, whereby to close contacts 258 and 260 connected to the counter 3. Furthermore, the drive motor 122 is connected through contacts 250 and 251 and operating potential applied to contact $f_4$ through contacts 255, 256, lead 273, contact 294, switch 293 and contact 295. Contact arm 286 is disconnected by the opening of switch 249 and contact 252 and magnet 215 is de-energized.

In the meantime, the tape 218 has been started. As a result, two pulses produced by the holes 325 and 326 of row 221 are applied to the magnet 227 through lead 280, whereby to cause contact arm 291 to advance by two steps, that is, connecting contacts $f_3$ and $f_4$. This results in the energization of the magnet 214 of the thread cutter 202. A hole 327 of row 221 initiates the return of the contact arm 291 to the positions $f_1$, $f_2$ by way of lead 281 and interruption of the contacts 294, 295 and 297 and 298 by energization of the magnet 292. As a result, the first part of the sewing programme, that is, the sewing of 525 stitches and cutting of the thread has been completed.

The tape 218 continues to operate and to set the counter to the next number, that is, "325" according to the example mentioned. Furthermore, the holes 228 and 229 cause the contact arm 286 to be advanced to position $d_3$ and the contact arm 287 to be advanced to position $e_3$. A hole 330 of row 138 causes operation of the switch 206, whereby to disconnect the drive motor 122 to effect stoppage of the tape 218 at point 331.

The photoelectric cell 20 is now connected to the counter 3 through lead 276, contact $d_3$, contact arm 286 and lead 277, while the switch magnet 310 of the polarity reversing switch 211 is energized through contacts 253, 252, lead 278 and contact $e_3$, whereby the switches 299 and 300 close the contacts 303, 304 and 307, 308. As a result, the feed motor is energized and operates the work feed device 208 and light chopper 2, producing counting pulses applied to the counter 3, in the manner described. Each pulse may correspond to an incremental movement of the work of, say of one millimeter, while transition from the counting number "999" to "000" results in a control pulse by the contact 41 initiating the stoppage of the feed motor 1 and returning the selector switches 123, 124, 125, 209 and 210 to zero position, in the manner described hereinbefore.

As a result, the control tape is re-started and the third part of the operating programme, that is, sewing of a seam of 545 stitches with simultaneous edge trimming of the work is initiated. At the same time, the counter is set to the next number "455," pre-punched upon the tape and the contact arms 286 and 287 of the step switch 209 are advanced to positions $d_4$ and $e_4$ by the pulses resulting from holes 332, 333 and 334, whereby to effect a preselection of the photoelectric cell 313 of the sewing machine and operation of the magnet 215 of the coupling motor 205. The contact arm 291 of the step switch 210 is adjusted to positions $f_6$ and $f_7$ by the five pulses resulting from holes 335, 336, 337, 338 and 339, whereby contact 525 of the switch 206 is connected with the operating magnet 213 of the edge trimmer 203 by way of lead 278, contact arm 287, contact $e_4$, contact $f_6$, contact arm 291, contact $f_7$, contact 298, contact 296 and contact 297. The tape is then arrested by a pulse resulting from hole 340 at a point 341 and the sewing machine re-started.

According to the fourth part of the programme, the work piece is reversed by a distance of 675 mm., for which purpose the counter 3 is set to number "325." The contact arms 286 and 287 of the step switch 209 are adjusted to positions $d_2$ and $e_2$ by a pulse resulting from hole 342, whereby to pre-set the photoelectric cell 20 and the reversing magnet 309 of the polarity switch 211. The polarity of the feed motor is reversed, whereby the latter rotates in the reverse direction upon subsequent energization. The contact arm 291 of the step switch 210 is returned to the free contacts $f_2$ and $f_1$ through control by the hole 343. The feed motor is started through the effect of hole 360 and the tape 218 arrested at point 344. After termination of the feed movement, the motor is arrested in the manner described before.

According to the fifth step of the operating programme, the tape 218 is to be returned to the initial starting position. After automatic re-starting of the tape, the counter 3 is pre-set to the number "995" by the effect of the holes of the rows 129, 130 and 131. Contact arms 286 and 287 are set to positions $d_5$ and $e_5$, respectively, by the holes 345, 346, 347 and 348 of row 219, whereby now the photo electric cell 231 is connected to the input of the counter 3 through lead 283, contact $d_5$, contact arm 286 and lead 277. Furthermore, preparatory connection is effected between the open contact 252 of the switch 206 with the electromagnet 264 of the switch 265, the lifting magnet 233 of the lift rod 234 and the coupling magnet 248 of the stirrup 246, by way of lead 278, contact arm 287, contact $e_5$ and lead 282. The hole 349 causes the contacts 250 and 251 of the switch 206 to be opened, thus disconnecting the tape drive motor 221 and arresting the tape at point 350. Contacts 258 and 259 having set the counter 3 to "counting" condition and contacts 252 and 253 are closed, whereby the lifting magnet 233, the magnet 264 and coupling magnet 248 become energized. The contact fingers 132, 133, 134, 139, 224, 226 and 229 are lifted from the tape and disengaged from the contact plate 221. The stirrup 246 is displaced against the action of spring 247, whereby to engage the coupling disc 241 with and to simultaneously separate the coupling disc 236 from said worm gear 235. Contacts 266 and 267 are closed by the switch 265, the drive motor 225 is started to operate, driving the supply drum 166 in clockwise direction through shaft 242 and bevel gears 243, 244. As a result, the tape is rewound, whereby the pulse generator 231, 232 produces five pulses applied to the counter 3 during passage of holes 351, 352, 353, 354 and 355. The counter, upon passing from number "999" to number "000" operates selector switches 123, 124, 125 and 209 through contact 41, resulting in de-energization of the lifting magnet 233, of electromagnet 264 and coupling magnet 248. The contact fingers 132, 133, 134, 139, 224, 226 and 229 are lowered upon the tape and the shaft 237 is again coupled with the worm gear 235 and contacts 266 and 267 are opened. At the same time, contacts 250 and 251 of the switch device 206 are closed, the tape motor 221 is re-started advancing the tape 218 until opening contacts 250 and 251 of the switch 206 by hole 256, whereby to finally arrest the tape at point 257. The entire programme has now been completed and may be repeated by renewed closing of the key 271.

In the foregoing, the invention has been described in reference to a specific illustrative device. It will be evident however, that modifications, as well as the substitution of equivalent elements, may be made without departing from the broader scope and spirit of the invention, as set forth in the appended claims. The specification and drawings are accordingly to be regarded in an illustrative rather than a limiting sense.

I claim:

1. In combination with a control system for consecutively advancing a movable member from one to the next of a plurality of successive predeterminedly spaced operating positions comprising electric drive means and means to control the same to start said member after lapse of a predetermined stationary period of said member at each said operation position; means operated synchronously with said member to produce a series of consecutive electric counting pulses each representing a predetermined incremental advance movement of said member, a pulse counter comprising a plurality of electronic decade counting stages each adapted to count a full decade of digits and each stage, excepting the last stage, controlling the next stage, to enable counting of a limit number of pulses determined by the number of decade stages of said counter, said last stage including means to produce a control pulse to stop said drive means upon reaching said limit counting number, means to apply said pulses to said counter, said counter including potentiometer means for presetting a desired digit within each decade stage, stepswitch means for each said counting stage, permanent storage means having scanning means and pickup means connected to said step-switch means, said storage means carrying a plurality of successive number storage data representing a series of predetermined consecutive advance movements of said member, means to consecutively intermittently scan said storage means during the stationary periods of said member at said operating positions, to produce control pulses adjusting said step-switch means in accordance with the numbers stored upon said storage means, and means to connect said step-switch means to said potentiometer means prior to the starting of an advance movement of said member by said drive means, whereby to pre-set said counter and to thereby effect the stoppage of said member upon completion of consecutive advance movements corresponding to the numbers complementary to the stored numbers upon said storage means in respect to said limit number.

2. In a control system as claimed in claim 1, the provision of means for re-setting both said selector switch means and said counter to the zero position simultaneously upon starting of the scanning of said storage means.

3. In combination with a control system for groupstitch sewing and the like multiple-operation machines of the type having a support for carrying a work piece to be operated on at and to be advanced from one to the next of a plurality of consecutive predeterminedly spaced operating positions, and means to automatically stop said machine upon completion of an operating cycle; electric drive means for said support, a counting pulse generator adapted to produce a series of consecutive electric counting pulses each representing a predetermined incremental advance movement of said support, a decade pulse counter comprising a plurality of electronic counting stages to count said pulses, said counter including means to produce a final control pulse, to start said drive means, upon reaching the limit counting number determined by the number of decade stages, potentiometer means for each said counting stage to pre-set said counters to a desired starting number between zero and said limit counting number, step-switch means for each said counting stage, permanent storage means including scanning and pickup means connected to said step-switch means, said storage means carrying digit storage data for each said counting stage representing a series of predetermined consecutive counting numbers, means to intermittently scan said storage means during the operating cycles of said machine, to produce control pulses adjusting said step-switch means in accordance with the numbers carried by said storage means, and means to connect said step-switch means to said potentiometer means prior to the starting of said drive means, whereby to pre-set said counter and to thereby effect the stoppage of said support upon completion of consecutive advance movements thereof corresponding to the numbers complementary to the stored numbers upon said storage means.

4. In a control system as claimed in claim 3, the provision of means for re-setting both said step-switch means and said counter to zero simultaneously upon starting of the scanning of said storage means.

5. A control system as claimed in claim 3, said scanning means comprising a scanning motor with means to start the same simultaneously with the starting of an operating cycle by said machine, and auxiliary storage data carried by said storage means and pickup and control means therefor, to stop said motor upon transfer of a counting number from said storage means to said step-switch means.

6. A control system as claimed in claim 3, said scanning means comprising a scanning motor and said storage device comprising a perforated tape operated thereby, means to start the said motor simultaneously with the starting of an operating cycle of said machine, and auxiliary storage data carried by said tape and pickup and control means cooperating therewith, to stop said motor upon transfer of a counting number from said tape to said step-switch means.

References Cited in the file of this patent
UNITED STATES PATENTS

| | | |
|---|---|---|
| 2,576,903 | Imm | Nov. 27, 1951 |
| 2,832,023 | Gough | Apr. 22, 1958 |
| 2,906,217 | Myska | Sept. 29, 1959 |